Figure 2:
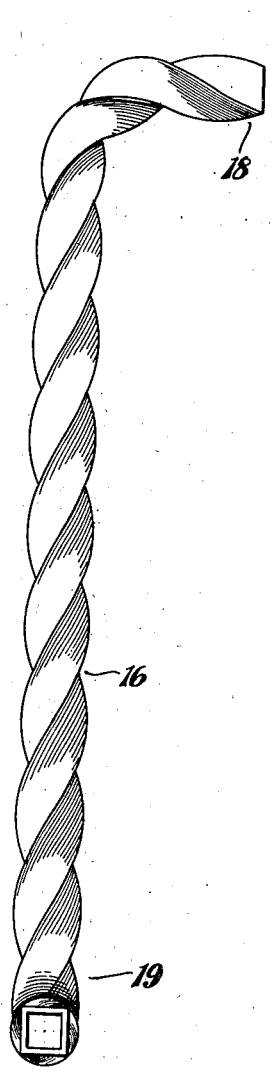

March 26, 1935.  L. C. BONNOT  1,995,791
PRODUCTS OF PLASTIC MATERIALS
Filed May 10, 1932  2 Sheets-Sheet 1

Inventor
L. C. Bonnot

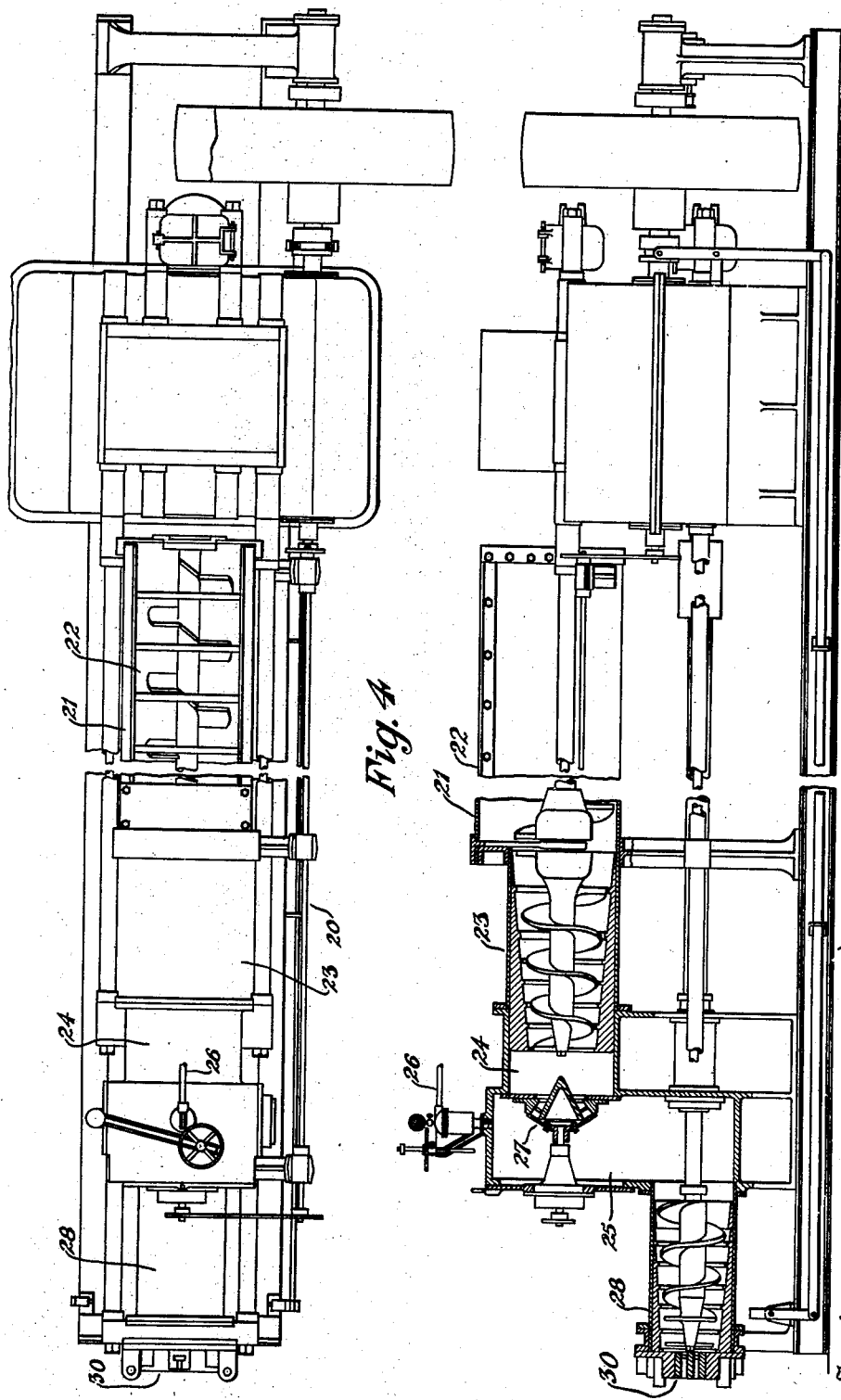

Patented Mar. 26, 1935

1,995,791

UNITED STATES PATENT OFFICE 1,995,791

PRODUCTS OF PLASTIC MATERIALS

Louis C. Bonnot, Louisville, Ohio, assignor to The Bonnot Company, Canton, Ohio, a corporation of Ohio Application May 10, 1932, Serial No. 610,422

21 Claims. (Cl. 137—75)

The invention relates to products of plastic materials, and more particularly to products of ceramic materials, such as clays, shales, and mixtures including the same, and the manufacture of which includes forcing or extruding a tempered or moistened plastic mass of such a material through a die and thus forming a longitudinally extending green column of the plastic material, the cross section of the column having different dimensions and shapes for different purposes, and the column being then severed into units, which are subsequently dried, and are usually fired to make finished burned ceramic products.

The invention also relates to extruded green columns or units made from plastic materials, such as Portland cements, and which harden directly in the air or atmosphere, and do not require firing.

Prior to the present invention, extruded unit products manufactured as aforesaid from such plastic material of any particular composition, such as a particular clay, or a particular mixture of clays, have been subject to certain dimensional limitations, which may be classified as follows:

(1) The maximum length of a unit has been limited both with and without respect to its transverse cross sectional area and the minimum dimension of its cross sectional area;

(2) The minimum transverse cross sectional area of a unit and the minimum dimension of the cross sectional area have been limited both with and without respect to its length; and (3) In the case of tubular or hollow products such as building tile, drain tile, conduits and the like, the minimum wall thickness of a unit has been limited both with and without respect to the over all transverse cross sectional area of the unit, and with and without respect to the length of the unit.

The foregoing dimensional limitations have arisen from the fact that the bodies or walls of extruded green columns and thus of the units severed from the columns have not been self-sustaining, when the unsupported columns or units severed from the columns have had dimensions contrary to the limits determined by experiment for the particular plastic material being processed.

It is necessary that green columns or units made from plastic material be self-sustaining in order that the subsequent drying and/or burning operations and the intervening handling operations may be carried out.

From the standpoint of length, it is desirable that the finished units be as long as possible for many reasons, the more important of which are to facilitate transporting and handling the units, to facilitate installing and/or joining the units at the place of use, and to minimize maintenance requirements for the joints between the units.

With particular reference to piping, the use of extruded ceramic piping has been practically prohibited, prior to the present invention, because the relatively short lengths of tubular ceramic products heretofore made by processes including extrusion, would not only involve an excessive cost of installation, but would also result in extreme difficulty in avoiding leakage, by reason of the multiplicity of joints or connections which would be required between the ends of such relatively short units.

From the standpoint of transverse cross sectional area as well as from the standpoint of wall thickness of tubular products, it is desirable that such dimensions be a minimum, in order to reduce the weight of the units and thus reduce substantially all costs connected with the making and using of the units.

In addition to the aforesaid dimensional limitations, prior to the present invention, extruded unit products made from plastic materials have been subject to form limitations, which have precluded the manufacture of any form except a longitudinally straight unit.

In other words it has never been possible prior to the present invention to make a bent, a twisted, or a bent and twisted extrusion product from plastic material such as clays, shales, and mixtures including the same, or such as Portland cements, because the usual longitudinally extending green column, or unit severed therefrom, cannot be displaced laterally from its longitudinally straight formation, without collapse of the body, wall, or walls of the column or unit.

From the standpoint of providing bent, twisted, or bent and twisted extruded ceramic products, and particularly bent, twisted, or bent and twisted extruded tubular ceramic prducts, such products, hitherto not available, are very desirable for use in pipe systems particularly, in the chemical, metallurgical, and processing industries, for insulation purposes either with respect to heat or electricity, and for conduits.

It is desirable to provide a unit which is bent or curved by having its longitudinal axis in a single plane, and having its body bent about an axis at right angles to the plane of the longitudinal axis, so as to form for example a pipe elbow.

It is also desirable to provide a unit which is twisted by having its body twisted about its longitudinal axis, as for example to form elongated ornamental units of square or rectangular cross sections.

It is also desirable to provide a unit which is bent and twisted, as for example to form a tubular coil either spiralled or helixed, for use as a condenser or heat transfer unit.

Many different reasons have been advanced for the aforesaid dimensional and form limitations heretofore encountered in the manufacture of products or articles of manufacture from such materials as the ceramic or fire hardening materials, such as clays, shales, and mixtures including the same, or the air hardening materials, which include some clays, shales, and mixtures including the same, as well as Portland cements.

All of such plastic materials may be termed heterogeneous plastic materials, because each comprises a mixture of solids, liquids, and gases, and the gases may or may not be that mixture of gases ordinarily called air, and it has become generally accepted that the gas content of such materials is one of the most important causes of the aforesaid dimensional and form limitations.

Heretofore by aging or tempering treatments, there has been effected a limited reduction in the ratio between the mass of gas or gases, and the mass of liquids and solids in any unit mass of such a heterogeneous plastic material.

The term homogenizing may be said to indicate any treatment which effects a greater reduction in the ratio between the mass of gas or gases, and the mass of liquids and solids in any unit mass of such a heterogeneous plastic material, than is effected by the usual aging or tempering treatments.

Likewise, such a heterogeneous plastic material may be said to be homogenized when the ratio between the mass of gas or gases, and the mass of liquids and solids in any unit mass of the heterogeneous plastic material, is less than the ratio would be if the material had been subject to the usual aging or tempering treatments.

Such a heterogeneous plastic material may be said to be highly homogenized or substantially degasified, when the gas content of the same has been substantially eliminated by any suitable treatment.

The objects of the present improvements include in general the provision of products made from plastic materials of the foregoing description, and which are not subject to the limitations as to dimensions and form, to which products made heretofore have been subject as aforesaid.

More specifically, from the standpoint of dimensions, the objects of the present improvements include the provision of preferably extruded products made of plastic materials, such as clays, shales, or mixtures including the same, or such as Portland cements, and which are unusually long both with and without respect to their transverse cross sectional areas or the minimum dimension of the same, and/or which have unusually restricted transverse cross sectional areas both with and without respect to their lengths, and/or which have an unusual minimum cross sectional dimension, and/or in the case of tubular products, which have unusually thin walls both with and without respect to their transverse cross sectional areas or their lengths.

More specifically, from the standpoint of form, the objects of the present improvements include the provision of preferably extruded products made of plastic materials, such as clays, shales, or mixtures including the same, or such as Portland cements, and which are bent, twisted, or bent and twisted to substantially any desired configuration.

More specifically, from the standpoint of both dimensions and form, the objects of the present improvements include the provision of preferably extruded products made of plastic materials such as clays, shales, or mixtures including the same, or such as Portland cements, and which may have any or all of the foregoing dimensional characteristics, and which at the same time are bent, twisted, or bent and twisted or otherwise distorted to substantially any desired configuration.

The foregoing and other objects are attained by the products, articles of manufacture, columns, units, parts, improvements, and combinations, which comprise the present invention, and the nature of which is set forth in the following general statement, and preferred embodiments of which are set forth in the following description, and which are particularly and distinctly pointed out and set forth in the appended claims forming part hereof.

The nature of the present invention may be set forth in general terms by stating that the improved products or articles of manufacture have improved dimensional characteristics, and include elongated members, which may be either columns or units, and which are made from homogenized plastic material, preferably material such as clay, shale, or mixtures including the same, or such as Portland cement, and each of which is equal to or greater than 48 inches in length, and/or each of which has a minimum dimension of its transverse cross sectional area equal to or less than $\tfrac{1}{4}$ inch, and/or each of which, when in the form of a tube, has an over all transverse cross sectional area equal to or less than 4 square inches, and/or each of which, when in the form of a tube, has a tube wall thickness of less than $\tfrac{1}{16}$ inch.

The nature of the invention may be further set forth in general terms by stating that the improved products or articles of manufacture have improved forms, and include elongated members, which may be either columns or units, and which are made from homogenized plastic material, preferably material such as clay, shale, or mixtures including the same, or such as Portland cements, and each of which is bent, twisted, or bent and twisted to substantially any desired configuration.

The nature of the invention may be still further set forth in general terms by stating that the improved products or articles of manufacture the improved products or articles of manufacture have improved forms and dimensional characteristics, and include elongated members which may be either columns or units, and which are made from homogenized plastic material, preferably materials such as clay, shale, or mixtures including the same, or such as Portland cement, and each of which is formed to substantially any and each of which is formed to substantially any desired configuration as aforesaid, and each of which may have at the same time any or all of the foregoing improved dimensional characteristics.

From a slightly different standpoint, the nature of the invention may be set forth in general terms by stating that the improved products or articles of manufacture include elongated members, which may be either columns or units, and which are made from homogenized plastic material, preferably material such as clay, shale, or mixtures including the same, or such as Portland cement, and each of which has a transverse cross sectional area whose minimum dimension is less than the minimum dimension of the transverse cross sectional area of a member having the same strength and the same maximum dimension of its transverse cross sectional area as the homogenized member and made from the same material in its unhomogenized state, and in the case of an elongated tubular member, this minimum dimension is the thickness of the tubular wall of the member.

The homogenized plastic material, from which the improved products are made, is preferably homogenized by reducing the gas content of comminuted or shredded plastic material, such as clay, shale, or mixtures including the same, preferably after the plastic material has been pugged and tempered by introducing the comminuted plastic material into a sealed chamber from which gases are being continuously pumped so that the pressure in the chamber is maintained at less than atmospheric and preferably at a vacuum of from 21 to 26 inches or higher of mercury, with a consequent continuous pumping away of the gas content of the comminuted plastic material introduced into the chamber, and then applying pressure to the shredded material having a reduced gas content, and extruding the material in the form of an elastic or rubbery homogenized mass, with the extrusion preferably effected through a die which simultaneously forms the desired transverse cross sectional shape for the extruded homogenized column.

Figure 1:
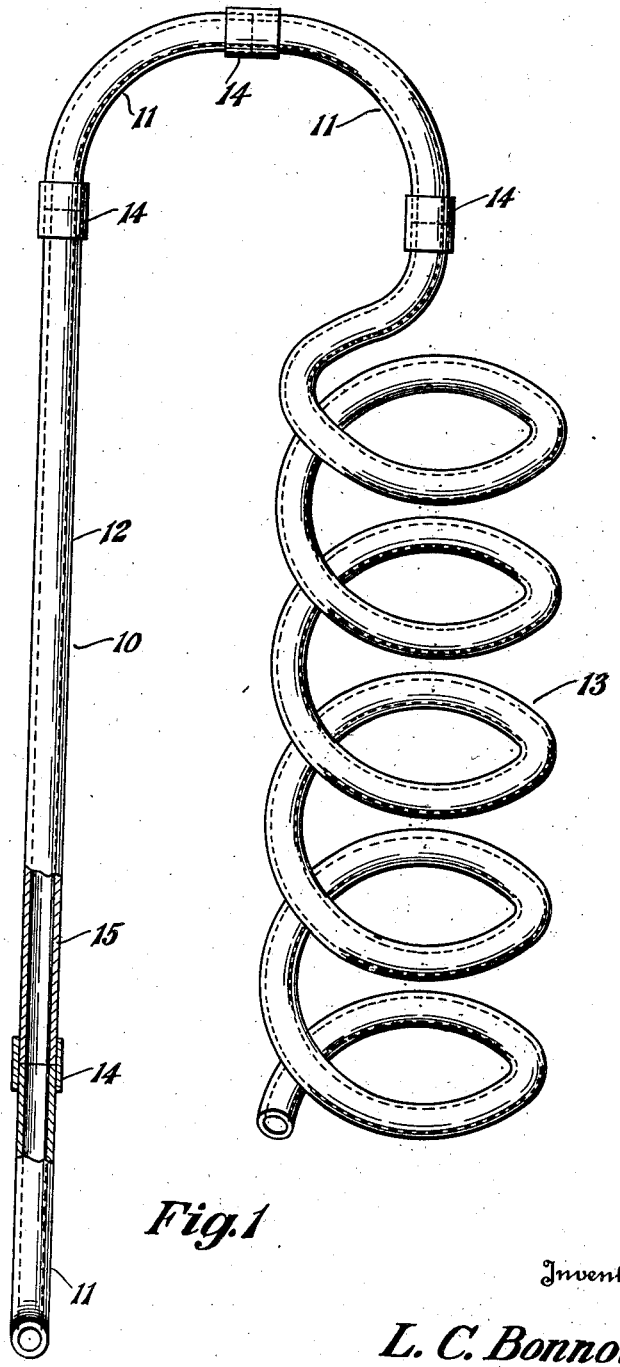

Typical embodiments of the improved products or articles of manufacture of the present improvements, comprising a piping system of straight lengths, elbows, and a helix coil, and an embodiment of an improved machine adapted for carrying out certain steps in the making of the improved products, are illustrated in the accompanying drawings forming part hereof, in which Figure 1 is an elevation view with portions in section illustrating a piping system embodying the improvements;

Fig. 2, an elevation view with portions in section illustrating another form of twisted, and bent and twisted elongated member embodying the improvements;

Fig. 3, a side elevation with portions in section illustrating an embodiment of the preferred improved machine adapted for carrying out certain steps in the making of the improved products; and Fig. 4, a top plan view thereof.

Similar numerals refer to similar parts throughout the drawings.

In Fig. 1, products or articles of manufacture of the present improvements are embodied in the piping system indicated generally by 10 and which includes improved elbows 11, a length of improved straight pipe 12, and an improved helix coiled pipe 13 connected with each other as by means of sleeves 14.

The length of improved straight pipe 12 constitutes a tubular member formed of homogenized plastic material. The length of the straight pipe or tubular member 12 may be 48 inches and upwards; the outside transverse cross sectional area of the tubular member 12 may be less than 4 square inches; and the thickness of the tubular wall 15 of the member 12 may be substantially within the limits ⅛ inch and 1/16 inch.

The elbows 11 have the same outside transverse cross sectional areas as the straight pipe or tubular member 12, and the elbows 11 each constitute a bent or curved tubular member formed of homogenized plastic material.

The helix coiled pipe 13 may be a heat exchange coil, and constitutes a tubular member having the same outside transverse cross sectional area as the straight tubular member 12 and the elbows 11, and being bent and twisted, or helix coiled, it being understood that to form any helix from a straight member requires bending and twisting of the straight member.

The particular dimensions of the above defined dimensional limitations of the improved products depend upon the particular plastic material from which the same are made.

For example, Ohio No. 5 fire clay was homogenized, and the transverse outside diameter of each of the circular tubular members 11, 12, and 13, was 1 1/16 inches, and the tubular wall thickness of each of the tubular members was 3/32 inch, and the length of each of the members 11, 12 and 13 was over 48 inches.

Other tubular members were made of homogenized fire clay, and had an outside transverse cross sectional circular area of 1½ inches diameter, and had a wall thickness of ⅛ inch.

In Fig. 2 is illustrated a tubular member indicated generally by 16, and having a square cross section, and being twisted about its longitudinal axis, and being simultaneously bent or curved at its ends 18 and 19.

The tubular members 11, 12, and 13 comprise single tubular structures, but tubular structures including multiple tubes such as building or conduit tiles have been made according to the present improvements.

Likewise, elongated members having solid cross sections have been made of homogenized plastic materials and have had the present improved dimensional and form characteristics, and each of said elongated members having solid transverse cross sectional areas may have any desired length of 48 inches and upwards, and the minimum dimension of their transverse cross sectional areas may be when desired substantially within the limits ⅛ inch and 1/16 inch, and when desired the outside transverse cross sectional area of each member may be less than 4 square inches, and the members may be bent, twisted, or bent and twisted to substantially any desired form.

In any event in any elongated member of homogenized plastic material of the present improvements, the minimum dimension of the transverse cross sectional area of the homogenized member is less than the minimum dimension of the transverse cross sectional area of a member having the same strength and the same maximum dimension of its similar transverse cross sectional area as the homogenized member and made from the same material in its un-homogenized state.

When the improved member is an elongated tubular member of homogenized plastic material, the foregoing minimum dimension is the thickness of the tubular wall of the homogenized member which is less than the thickness of the tubular wall of a tubular member having the same strength and the same inside transverse cross sectional area as the homogenized member and made from the same material in its un-homogenized state.

In other words a substantial saving in weight of material is obtained by the use of the present improved products for any given duty.

The present improved products may also be made of material which is otherwise not available for use in making a particular product, that is to say certain clays hitherto not practically possible to be formed into tubular shapes, may be produced and have the characteristics of the present improved products.

The improved products hereof are preferably produced by the use of an improved homogenizing apparatus indicated generally by 20.

The apparatus 20 includes a pug mill 21 adapted to receive through an upper opening 22 therein in a usual manner the particular plastic material to be homogenized.

The pug mill 21 communicates with a screw extrusion press indicated generally by 23 which delivers the pugged or tempered plastic material from the pug mill 21 into a first sealing cylinder 24 from which the compressed material is introduced into a vacuum chamber 25, the gas content of which is continuously pumped away as through a pipe line 26 connected with a suitable pump, so that the pressure in the vacuum chamber 25 is continuously maintained at preferably from 21 to 26 inches or higher of mercury.

Before entering the vacuum chamber 25 the tempered plastic material preferably passes through a comminuting apparatus indicated generally by 27, and which is the invention of The vacuum chamber 25 communicates with a screw extrusion press 28 where the final step of the homogenizing operation is completed by compressing the plastic material from which the gas content has been reduced by comminution or shredding of the same as it passes through the vacuum chamber 25.

The homogenized plastic material is then preferably extruded through a die indicated generally by 30 and which preferably forms the desired transverse cross sectional area of the green column of homogenized plastic material.

The homogenized green column is then severed to make self-sustaining straight green members such as the straight tubular member 12; or the green column, which has unusual elastic or rubbery characteristics, may be bent, twisted, or bent and twisted, to form in the green state the self-sustaining bent members 11, or the self-sustaining bent and twisted members 13, and 16, or otherwise further formed to substantially any desired configuration.

The improved members, such as 11, 12, 13, and 16, when made of ceramic materials requiring firing, are then dried in the usual manner, and fired; or when made of air hardening materials the improved members are permitted to air harden in a usual manner.

I claim:

1. An article of manufacture comprising an elongated member of homogenized and substantially degasified ceramic material, the length of the member being 48 inches and upwards.

2. An article of manufacture comprising an elongated member of homogenized and substantially degasified ceramic material, the minimum dimension of the transverse cross sectional area of the member being substantially within the limits ⅛ inch and 1/16 inch.

3. An article of manufacture comprising an elongated tubular member of homogenized and substantially degasified ceramic material, the outside transverse cross sectional area of the member being less than 4 square inches.

4. An article of manufacture comprising an elongated tubular member of homogenized and substantially degasified ceramic material, the thickness of the tubular wall of the member being substantially within the limits ⅛ inch and 1/16 inch.

5. An article of manufacture comprising an elongated tubular member of homogenized and substantially degasified ceramic material, the outside transverse cross sectional area of the member being less than 4 square inches, and the thickness of the tubular wall of the member being substantially within the limits ⅛ inch and 1/16 inch.

6. An article of manufacture comprising an elongated tubular member of homogenized and substantially degasified ceramic material, the thickness of the tubular wall of the member being substantially within the limits ⅛ inch and 1/16 inch, and the length of the member being 48 inches and upwards.

7. An article of manufacture comprising an elongated tubular member of homogenized and substantially degasified ceramic material, the length of the member being 48 inches and upwards.

8. An article of manufacture comprising an elongated tubular member of homogenized and substantially degasified ceramic material, the outside transverse cross sectional area of the member being less than 4 square inches, the thickness of the tubular wall of the member being substantially within the limits ⅛ inch and 1/16 inch, and the length of the member being 48 inches and upwards.

9. An article of manufacture comprising an elongated tubular member of homogenized and substantially degasified ceramic material, in which the thickness of the tubular wall of the homogenized member is less than the thickness of the tubular wall of a tubular member having the same strength and the same inside transverse cross sectional area as the homogenized member and made from the same material in its un-homogenized state.

10. An article of manufacture comprising an elongated member of homogenized and substantially degasified ceramic material, in which the minimum dimension of the transverse cross sectional area of the homogenized member is less than the minimum dimension of the transverse cross sectional area of a member having the same strength and the same maximum dimension of its transverse cross sectional area as the homogenized member and made from the same material in its un-homogenized state.

11. An article of manufacture comprising an elongated member of homogenized and substantially degasified plastic material, the member being bent.

12. An article of manufacture comprising an elongated member of homogenized and substantially degasified plastic material, the member being twisted.

13. An article of manufacture comprising an elongated member of homogenized and substantially degasified plastic material, the member being bent and twisted.

14. An article of manufacture comprising an elongated member of homogenized and substantially degasified plastic material, the member being curved.

15. An article of manufacture comprising an elongated member of homogenized and substantially degasified plastic material, the member being helixed.

16. An article of manufacture comprising an elongated tubular member of homogenized and substantially degasified plastic material, the member being bent.

17. An article of manufacture comprising an elongated tubular member of homogenized and substantially degasified plastic material, the member being twisted.

18. An article of manufacture comprising an elongated tubular member of homogenized and substantially degasified plastic material, the member being bent and twisted.

19. An article of manufacture comprising an elongated tubular member of homogenized and substantially degasified plastic material, the member being curved.

20. An article of manufacture comprising an elongated tubular member of homogenized and substantially degasified plastic material, the member being helixed.

21. An article of manufacture comprising an elongated tubular member of homogenized and substantially degasified plastic material, the member being distorted.

LOUIS C. BONNOT.